Patented Oct. 27, 1936

2,058,569

UNITED STATES PATENT OFFICE 2,058,569

PROCESS FOR SEPARATING PETROLEUM EMULSIONS

Ivor M. Colbeth, East Orange, N. J., assignor to Baker Castor Oil Company, New York, N. Y., a corporation of Delaware No Drawing. Application January 14, 1936, Serial No. 59,089

15 Claims. (Cl. 196—4)

This application is a continuation in part of my earlier application Serial Numbers 567,753; 719,293 and 757,124.

This invention relates to the treatment of petroleum emulsions and petroleum containing emulsions of water and oil and foreign matter, commonly known as cut oil, wet oil, roily oil, emulsified oil, bottom settlings, basic sediment and B. S., etc. for the purpose of effecting the separation of the oil in the emulsion from the water and/or foreign matter, and rendering the oil suitable for commercial use.

Petroleum emulsions are of the water in oil type and are obtained from producing wells and from the bottom of oil storage tanks. These emulsions contain varying amounts of oil, water, brine and/or foreign matter and are more or less stable, depending upon the conditions under which the emulsions are formed. Emulsions containing finely dispersed water, brine, or foreign matter are difficult to break and are known as "tight" emulsions. Other emulsions not containing finely dispersed water, brine or foreign matter are known as "loose" emulsions. Emulsions differ in composition and character, as different crude oils differ in viscosity and gravity and are produced under many different conditions. Adsorbed earthy matter, asphaltic matter, paraffinic matter, colloidal matter, water, brine, high gas pressure, naturally occurring in the production of crude oil cause the water and/or other foreign matter to emulsify with the oil. Methods employed for pumping or lifting the oil from the well also contribute to the formation of emulsions. All these factors create different kinds of emulsions. Some are tight and difficult to treat, others are loose and not difficult to treat in order to break the emulsion and separate the oil from the water and foreign matter.

I have discovered that petroleum emulsions can be broken and the water and/or foreign matter separated from the oil by means of a treating agent comprising blown or oxidized fatty oils and accordingly it is an object of this invention to treat petroleum emulsions by this means.

The term "blown fatty oil" as herein used includes not only the oxidized fatty oils but also the oxidized polymerized fatty oils obtained by simultaneous oxidation and polymerization, or by oxidation and subsequent polymerization, or polymerization and subsequent oxidation of fatty oils. The term "blown fatty oil" is further intended to include the products obtained when the fatty acids are used in place of the fatty oils.

The preferred blown fatty oil is blown castor oil, as it has thus far been found to be the most effective and satisfactory oil to use in the process. Other fatty oils susceptible to blowing and capable of preparation suitable for treating petroleum emulsions may be used, such as rape oil, corn oil, olive oil, and sardine oil, and the like.

Suitable blown fatty oils for breaking petroleum emulsions may be obtained by stirring and blowing the fatty oils in any suitable container equipped with a stirring device preferably at a temperature of from about 150° F. to about 475° F., with air, ozone, ozonized air or oxygen and for a period of time ranging from about 6 to about 30 hours or more, the time depending to a large extent upon the temperature used, without or with catalyzers capable of acting as catalyzers for blowing fatty oil, such as iron salts of organic acids, as oleic, linoleic, ricinoleic and the like, or other metal soaps, as tin, nickel, cobalt, or metal radicals having valency higher than one.

A satisfactory blown fatty oil suitable for treating petroleum emulsions may be prepared by stirring and rapidly heating castor oil to approximately 320° F. temperature and intimately blowing air through the oil at the rate of about 15 cubic feet per minute per 1,000 lbs. of castor oil for a period of approximately six hours. After allowing the blown oil to cool it is ready for use.

Another satisfactory blown fatty oil is prepared by rapidly heating castor oil to a temperature of about 285° F. while stirring, and using iron ricinoleate as a catalyst, one part of the catalyst being used to 150,000 parts by weight of oil, and blowing the oil with air for about thirty hours. After allowing the blown oil to cool it is ready for use.

The time and temperature required for blown fatty oils may be varied. As petroleum emulsions vary in character, the degree of blowing of fatty oils suitable for particular types of petroleum emulsions may be determined by test.

The blown fatty oils may be mixed or combined with a viscosity reducing solvent in order to facilitate ease of handling, feeding, etc. Suitable viscosity reducing solvents may be selected from the solvents, such as benzol, toluol, anthracene oil, xylene, propyl alcohol, pine oil, acetone, petroleum solvents and the like.

In practicing the process a small amount of the blown fatty oil may be fed into the emulsion by means of pressure lubricators or pumps of the type now in general use in the oil fields, for mixing with the emulsion approximately one part of blown fatty oil to amounts of the emulsion ranging from 500 parts to 10,000 parts of emulsion, depending upon the type and kind of emulsion being treated, and the mass allowed to stand until the emulsion breaks and separates into an upper layer of oil and a lower layer of water and foreign matter. The water and foreign matter are afterwards drawn off from the commercial oil. In most cases mixing the blown fatty oil with the emulsion in the usual manner is sufficient to break and separate the emulsion in a period of time of one to six hours but in some cases where tight emulsions are being treated heat and/or agitation may be applied by the usual methods employed in the oil fields, and a period of time of one to eighteen hours may be required to break and separate the emulsion.

A satisfactory polymerized fatty oil such as castor oil, for example, suitable for blowing may be prepared by heating and stirring castor oil, while excluding air from it, to a temperature of 475° F. to 700° F. for about 4 to 10 hours.

After the oil has been polymerized, it may be oxidized, thus obtaining compounds that are less soluble in petroleum oil than the polymerized products themselves. The oxidation of the polymerized oil may be accomplished, for example, by blowing air through the polymerized oil at temperatures from about 190° F. to about 300° F. for about one hour to six hours. This oxidized polymerized oil may be used for breaking petroleum emulsion in a manner similar to that described above.

I claim:

1. A process for treating petroleum emulsions which comprises subjecting the emulsion to the action of an unsaponified blown fatty oil capable of and in sufficient amount to break the emulsion, and allowing the mass to stand for a period of time sufficient to effect a separation of the emulsion into an upper layer of oil and a lower layer of water and foreign matter, then drawing off the water and the foreign matter.

2. A process for treating petroleum containing emulsions of oil, water and foreign matter, which comprises subjecting the petroleum containing emulsions to the action of an unsaponified blown fatty oil capable of and in sufficient amount to break the emulsion, and allowing the mass to stand for a period of time sufficient to effect a separation of the emulsion into an upper layer of oil and a lower layer of water and foreign matter, then drawing off the water and foreign matter.

3. A process for treating petroleum emulsions which comprises subjecting the emulsion to the action of an unsaponified blown polymerized fatty oil capable of and in sufficient amount to break the emulsion, and allowing the mass to stand for a period of time sufficient to effect a separation of the emulsion into an upper layer of oil and a lower layer of water and foreign matter, then drawing off the water and the foreign matter.

4. A process for treating petroleum emulsions which comprises subjecting the emulsion to the action of an unsaponified blown fatty oil and a viscosity reducing solvent, said oil being capable of and in sufficient amount to break the emulsion, and allowing the mass to stand for a period of time sufficient to effect a separation of the emulsion into an upper layer of oil and a lower layer of water and foreign matter, then drawing off the water and the foreign matter.

5. A process for treating petroleum emulsions which comprises subjecting the emulsion to the action of a blown castor oil capable of and in such proportions as to break the emulsion, and allowing the mass to stand for a period of time sufficient to effect a separation of the emulsion into an upper layer of oil and a lower layer of water and foreign matter, then drawing off the water and the foreign matter.

6. A process for treating petroleum emulsions which comprises subjecting the emulsion to the action of a blown polymerized castor oil capable of and in such proportions as to break the emulsion, and allowing the mass to stand for a period of time sufficient to effect a separation of the emulsion into an upper layer of oil and a lower layer of water and foreign matter, then drawing off the water and the foreign matter.

7. A process for treating petroleum emulsions which comprises subjecting the emulsion to the action of a blown rape oil capable of and in such proportions as to break the emulsion, and allowing the mass to stand for a period of time sufficient to effect a separation of the emulsion into an upper layer of oil and a lower layer of water and foreign matter, then drawing off the water and foreign matter.

8. A process for treating petroleum emulsions which comprises subjecting the emulsion to the action of a blown polymerized rape oil capable of and in such proportions as to break the emulsion, and allowing the mass to stand for a period of time sufficient to effect a separation of the emulsion into an upper layer of oil and a lower layer of water and foreign matter, then drawing off the water and foreign matter.

9. A process for treating petroleum emulsions which comprises subjecting the emulsion to the action of a blown corn oil capable of and in such proportions as to break the emulsion, and allowing the mass to stand for a period of time sufficient to effect a separation of the emulsion into an upper layer of oil and a lower layer of water and foreign matter, then drawing off the water and foreign matter.

10. A process for treating petroleum emulsions which comprises subjecting the emulsion to the action of a blown polymerized corn oil capable of and in such proportions as to break the emulsion, and allowing the mass to stand for a period of time sufficient to effect a separation of the emulsion into an upper layer of oil and a lower layer of water and foreign matter, then drawing off the water and foreign matter.

11. A process for breaking petroleum emulsions which comprises treating the emulsion with an unsaponified blown fatty oil.

12. A process for breaking petroleum emulsions which comprises treating the emulsion with an unsaponified blown and polymerized fatty oil.

13. A process for breaking petroleum emulsions which comprises treating the emulsion with blown castor oil.

14. A process for breaking petroleum emulsions which comprises treating the emulsion with blown rape oil.

15. A process for breaking petroleum emulsions which comprises treating the emulsion with blown corn oil.

IVOR M. COLBETH.